W. P. McCOMB.
COMBINATION VALVE CAP AND TIRE DEFLATOR.
APPLICATION FILED APR. 2, 1920.

1,370,603.

Patented Mar. 8, 1921.

INVENTOR
William P. McComb,
BY
Hardway & Cathey
ATTORNEYS

UNITED STATES PATENT OFFICE.

WILLIAM P. McCOMB, OF CONROE, TEXAS.

COMBINATION VALVE-CAP AND TIRE-DEFLATOR.

1,370,603.  Specification of Letters Patent.  Patented Mar. 8, 1921.

Application filed April 2, 1920. Serial No. 370,792.

*To all whom it may concern:*

Be it known that I, WILLIAM P. McCOMB, a citizen of the United States, residing at Conroe, in the county of Montgomery and State of Texas, have invented certain new and useful Improvements in Combination Valve-Caps and Tire-Deflators, of which the following is a specification.

This invention relates to new and useful improvements in a combination valve cap and tire deflator.

One object of the invention is to provide a device of the character described which at once serves as a valve cap, for pneumatic tires and a valve remover and tire deflator.

Another object of the invention is to provide a device of the character described which may be formed of a single piece of sheet metal stamped in the desired form and which is effective for use as a cap to close the valve tube of a pneumatic tire and which may also be used as a wrench for unscrewing the valve when it is desired to remove the same, and as a deflator to hold the valve open for the purpose of deflating the tire.

Another object of the invention is to provide a device of the character described which is simple in construction and convenient and effective in use.

With the above and other objects in view the invention has particular relation to certain novel features of construction and use, an example of which is given in this specification and illustrated in the accompanying drawings wherein.

Figures 1, 2:
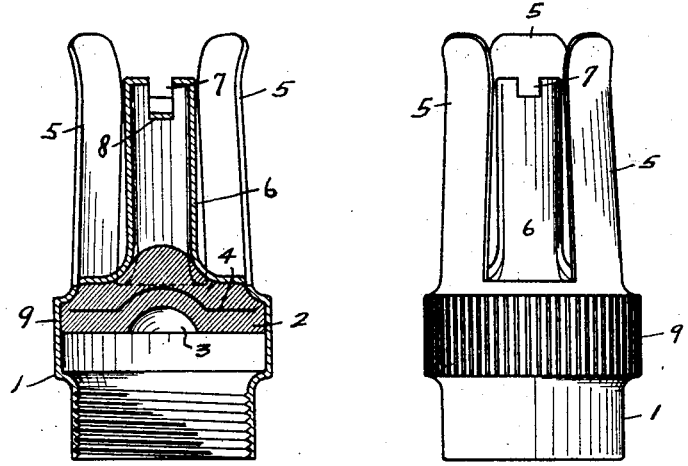
Figure 1 is a longitudinal sectional view of the device.
Fig. 2 is a side elevation.

Referring now more particularly to the drawings wherein like numerals of reference designate similar parts in each of the figures, the numeral 1 refers to a cap which is adapted to be screwed on to the valve tube of a pneumatic tire in the ordinary way and fitted within this cap there is a thick rubber gasket 2 which fits closely against the outer end of the valve tube when the cap is screwed in place to prevent air from leaking from said tube should the valve be defective. This gasket has a central recess 3 into which the outer end of the valve stem protrudes so that the valve will not be held open when the cap is screwed into place. The gasket may be reinforced when desired by means of a metallic disk 4 which is embedded therein. The cap carries the outwardly projecting prongs 5, whose free ends are outwardly curved and is also formed with a central post 6, whose outer end is formed with a transverse notch 7, forming a wrench.

When it is desired to use the device as a wrench the cap is unscrewed from the valve tube and reversed, the prongs 5 embracing said tube and the wrench entering the tube. The wrench is thus engaged with the valve and by turning the device the valve may be unscrewed and removed.

In case it is desired to use the device as a deflator it is applied to the tube in such a manner that the prongs will fit over said tube and grip the same, the outer end of the post 6, entering the tube and the transverse web 8 thereof resting against the outer end of the valve stem to hold the valve open until the air escapes. The prongs 5 are sufficiently flexible to permit the device to be readily applied to the valve stem and to permit the same to be turned to unscrew and remove the valve, and yet they have sufficient gripping power to hold the device on the tube for the purpose of holding the valve open to permit the escape of air to deflate the tire.

Figures 3, 4:
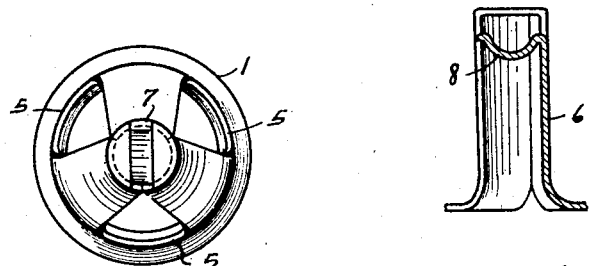
Fig. 3 is a plan view.
Fig. 4 is a longitudinal sectional view of the valve wrench and deflator.

This device is formed of a single sheet of metal which is first cut into a circular form and then stamped into a thimble like structure. The thimble is then slitted in such a manner as to form the prongs 5 and the remaining portion thereof is then formed by means of a suitable die into the central post 6. Two transverse slits are then cut into the outer end of said post, said slits being spaced apart. The metal between the slits is then bent downwardly as shown in Figs. 1 and 4, to form the web 8. The prongs 5 are curved outwardly at their free ends to readily fit over the valve tube and the open end of the thimble is internally threaded as shown so that the same will serve as a valve cap. The device may be given any suitable contour, the preferred form being shown and a section as 9 is knurled so that it may be readily screwed on to and unscrewed from the valve tube.

What I claim is:

1. A device of the character described including a cap formed of one piece of metal adapted to be screwed on to the valve tube of a pneumatic tire, flexible prongs integral with said cap and a central post formed integrally therewith and whose outer end is formed into a wrench having a transverse web.

2. A device of the character described including a cap formed of one piece of metal adapted to be screwed on to the outer end of a valve tube, flexible prongs formed integrally with said cap and a central post also formed integrally therewith and whose free end has a transverse notch and a web extending across said notch.

3. A device of the character described including a cap formed of one piece of metal adapted to be screwed on to the valve tube of a pneumatic tire, flexible prongs formed integrally with said cap, whose free ends are outwardly curved, a resilient gasket having a central recess and fitting within the outer end of said cap, a central post formed integrally with the cap, whose outer end is formed with a notch and a transverse web.

4. A one piece valve cap adapted to be screwed on to a valve stem of a pneumatic tire comprising a body portion internally threaded, flexible prongs integral with and upstanding therefrom, the outer ends of which are outwardly curved, a central post formed integrally therewith, whose outer end is formed with a notch and a web.

5. A valve cap adapted to be screwed onto the valve stem of a pneumatic tire comprising a body portion internally threaded, flexible prongs upstanding therefrom, the outer ends of which are outwardly curved, a central upstanding post formed integrally therewith, whose outer end is formed with a notch spanned by a transverse web, a resilient gasket having a central recess and fitting within the body portion of said cap, the entire cap being formed of one piece of metal.

In testimony whereof I have signed my name to this specification in the presence of two subscribing witnesses.

WILLIAM P. McCOMB.

Witnesses:
WM. A. CATHEY,
O. B. CLAYTON.